Oct. 13, 1936.　　　G. WAALKES　　　2,057,173
CONVEYER SYSTEM
Filed Feb. 15, 1932　　　5 Sheets-Sheet 1

INVENTOR
Gerrit Waalkes.
BY
ATTORNEYS.

Oct. 13, 1936.  G. WAALKES  2,057,173
CONVEYER SYSTEM
Filed Feb. 15, 1932    5 Sheets-Sheet 2

INVENTOR
Gerrit Waalkes.
BY
ATTORNEYS.

Oct. 13, 1936.  G. WAALKES  2,057,173
CONVEYER SYSTEM
Filed Feb. 15, 1932   5 Sheets-Sheet 5

INVENTOR
Gerrit Waalkes.
BY
ATTORNEYS

Patented Oct. 13, 1936

2,057,173

UNITED STATES PATENT OFFICE

2,057,173

CONVEYER SYSTEM

Gerrit Waalkes, Highland Park, Mich., assignor to Anchor Steel & Engineering Co., a corporation of Michigan Application February 15, 1932, Serial No. 592,951

13 Claims. (Cl. 198—177)

The invention relates to endless conveyer systems and it has particular relation to a conveyer system in which a plurality of drive units are employed at spaced points along the conveyer for driving it.

In conveyer systems of the multiple drive unit type it is quite important that each drive unit take care of the conveyer load only between it and the succeeding drive unit if the system is to operate satisfactorily. Evidently if one drive unit at times is partially loaded with the next drive unit or the conveyer load the latter is supposed to carry, the drive units may not function properly, and the purpose of using a plurality of drive units to distribute the load, would at least be partially defeated. Moreover, if it is possible that any unit be so overloaded, it becomes necessary to employ larger and more expensive units than would be required if the loads were properly distributed.

Partial loading of one drive unit with the load of another may be caused by relative variations in speed, resulting in one unit traveling faster than the other, in which event one unit is pulling the other and its load. Such variations in speed may be caused by various factors such as different loadings on different parts of the conveyer, and friction unequally impeding movement of different parts of the conveyer. Moreover, variations in length of links, if the conveyer is of the link type, may cause one unit to partially carry another even in the absence of relative speed variations.

Whether or not the system operates at a fixed or variable speed depends upon manufacturing requirements. In either case, when the system is operating at a set speed, it is desirable that the speeds of the different units normally be synchronous and that in the event of any disturbing factors, the units automatically will vary substantially in synchronism and return to their normal operation substantially in synchronism. Moreover, during such operation, it is desirable that the units continue to carry their respective loads, so that the system may be depended upon to normally maintain a set speed and insure proper distribution of loads on the units.

When the variable speed unit is employed, it is important that the system not only operate as described above for one speed, but that it so operate at variable speeds. Moreover, it is desirable that the speed of the system be variable quickly and easily and that when the speed is changed, the system may be relied upon to operate at the new speed in the same manner, regardless of disturbing factors which may or may not arise.

One of the objects of this invention is to provide a conveyer system of the multiple drive unit type, which will automatically so operate that each drive unit will carry that conveyer load from it to the succeeding drive unit, regardless of load variations, variations in speed of one or more drive units, variations in length of the conveyer between the drive units or other factors which may be present. It is quite apparent that a conveyer system which will accomplish this result in an efficient and economical manner, will practically solve the problems involved in multiple drive unit conveyer systems, where operating conditions may vary.

Another object of the invention is to provide a system of this character in which the drive units will normally operate in synchronism, that is at synchronous speeds, without throwing the load carried by one drive unit upon another drive unit. It is evident in a system that insures each drive unit carrying only the load between it and the succeeding drive unit, that overloading of any one drive unit will not occur unless that part of the conveyer between it and the succeeding drive unit should be overloaded with the articles it carries, and this ordinarily never will occur because each unit usually is so designed that it will take care of any ordinary product load which may be imposed upon the conveyer between it and the succeeding drive unit.

Another object of the invention is to provide a conveyer system of multiple drive unit character, in which each drive unit takes care of the conveyer load between it and the succeeding drive unit by reason of an automatic maintenance of slack in the conveyer at the advance side of each drive unit. It is evident that if slack is maintained at the advance side of each drive unit, at all times regardless of variations in load conditions, variations in speed of any or all of the drive units, or other factors such as variation in chain link length, one drive unit will never be able to partially carry the succeeding drive unit or any load supposed to be carried by the latter.

It is another object of the invention to provide a conveyer system of the last mentioned character, in which the amount of slack automatically controls the speed of the drive unit of which it is in advance.

It is another object of the invention to provide a conveyer system of the last mentioned character which so operates that when one drive unit varies in speed, the slack at the advance side of the succeeding unit will vary in amount, and this variation in slack will automatically operate to vary the speed of said succeeding drive unit until its speed becomes synchronous with the speed of the first drive unit and that each succeeding drive unit will in the same manner have its speed synchronized with the speed of the drive unit in front of it, by the variation of the slack at the advance side thereof.

Another object of the invention is to provide a conveyer system having an arrangement of this character, in which one of the drive units is employed as a variable speed master control unit, which so operates that by varying the speed of the master unit, the speeds of the succeeding drive units may be automatically varied until they are synchronous with the speed of the master unit.

Another object of the invention is to provide a multiple drive unit conveyer system in which a master drive unit may be employed which automatically maintains the speeds of the succeeding units in synchronism therewith by controlling variations in slack between the different units.

Another object of the invention is to provide a multiple drive conveyer system, in which a substantially constant amount of slack is maintained at the advance side of each unit regardless of variations in speed and other operating conditions of the system; so that the slack take up at the advance side of any unit need not be arranged to accommodate undesirably large amounts of slack.

Other objects of the invention will become apparent from the following description, drawings relating thereto, and the claims hereinafter set forth.

For a better understanding of a particular embodiment of the invention, reference may be had to the accompanying drawings forming a part of the specification, wherein:

Fig. 8 is a plan view of the drive unit arrangement indicated at D in Fig. 1;

Fig. 9 is a side elevational view of the unit shown by Fig. 8.

Figure 4:
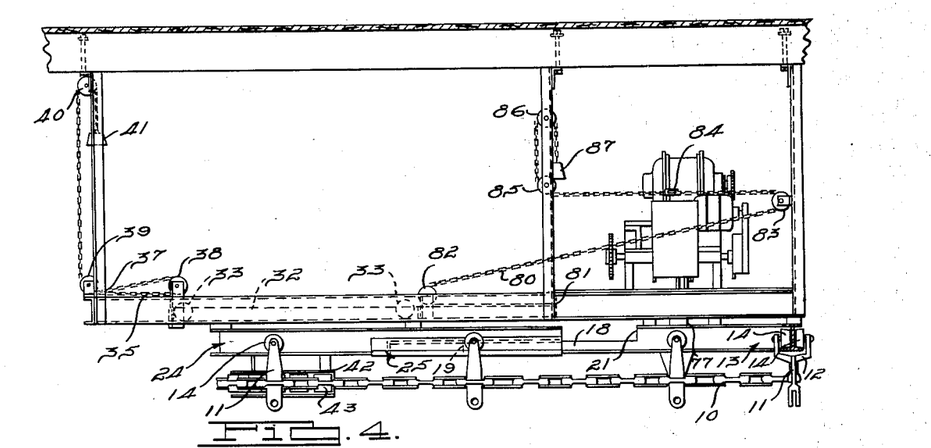
Fig. 4 is a side elevational view of the drive unit arrangement shown by Fig. 2.

While different kinds of conveyers and carriers therefor may be employed, it is preferred to employ a conveyer of the chain type which is carried by a mono-rail of I beam character. This chain is indicated at 10 and comprises pivotally connected links permitting deflection of the chain in a horizontal plane. As shown by Fig. 4, the chain is suppported on the mono-rail indicated at 13, by members 11 having, for example, upper bifurcated portions 12 straddling the rail. Each leg of the bifurcated portion 12 is pivotally associated with a roller 14 and it will be noted that one of the rollers is disposed at one side of the I beam web while the other roller is disposed at the other side. The rollers normally run on the lower legs of the beam, at opposite sides of the web. The lower part of the element 11 preferably is provided with some suitable connecting means so that products being manufactured or other elements to be carried by the conveyer, may be hooked thereon. It will be understood that the mono-rail is of endless character and that the chain likewise is endless and travels in an endless path along the mono-rail carrier.

Figure 1:
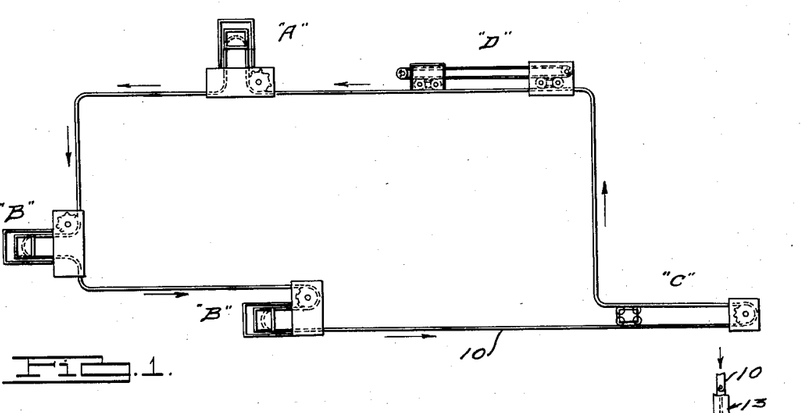
Figure 1 illustrates diagrammatically a conveyer system of the multiple drive unit type, constructed according to one form of the invention.

As has been indicated previously, the conveyer is to be driven by a plurality of drive units, and these drive units as shown diagrammatically by Fig. 1, are indicated at A, B, C and D. In the particular illustration, two drive units B are employed merely to further illustrate the flexibility of the system, and it is to be understood that more or less than the number of units shown may be employed although of course two units will be necessary to provide a plurality drive. For illustrating the invention more clearly, the different units shown diagrammatically in Fig. 1 will be described in order, prior to generally describing the operation of the system.

Figures 2, 3:
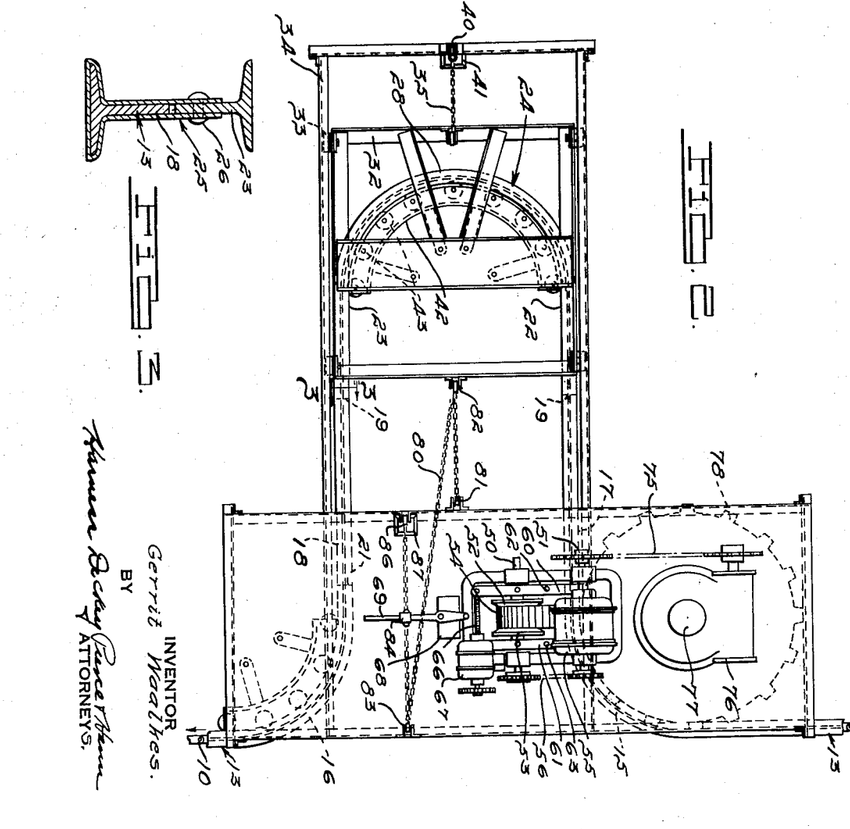
Fig. 2 is a plan view of the variable speed drive unit arrangement indicated at A in Fig. 1, which has electrically operated speed control means.
Fig. 3 is a cross-sectional view on a larger scale, illustrating a mono-rail support for the conveyer, and particularly a telescopic arrangement of mono-rail slack take-up to permit accommodation of varying amounts of slack in the conveyer at the advance side of the drive unit.

Referring to Figs. 2 and 4 illustrating the drive unit A, the mono-rail carrier 13 is shown as being deflected or bent at 15 and 16 to provide straight portions 17 and 18 directed in this instance substantially parallel and in spaced relation. These straight portions 17 and 18 terminate at points 19 and between such points of termination and points indicated at 21, the upper half of the rail is removed as shown by Fig. 3. The removal of the upper part of the beam provides a space for acccommodating straight rail sectors 22 and 23 of a slack take-up device 24. Such sectors as shown by Fig. 3, have their lower portions removed, so that the sector 23 may move along above the straight rail portion 18, and the sector 22 may ride along above the straight rail portion 17. For telescopically associating the parts, members 25 are secured by rivets 26 to the cut away web portions of the sectors 22 and 23 and, as shown by Fig. 3, such members are in the form of complementary housings for the altered parts of rail portions 17 and 18. It will be readily understood from Fig. 4, that sectors 22 and 23 thus may telescopically move with respect to the straight rail portions 17 and 18 and thereby vary the effective length of the conveyer mono-rail. The sectors 22 and 23 are integral at their opposite ends with a curved rail sector 24, from which it follows that the mono-rail is intact although provided with a variable slack take-up, and that the rollers 14 carrying the chain 10 may travel over the straight rail portion 17, the housing 25 receiving it, the curved sector 24, the other housing 25 and over the straight portion 18 without noticeable interference.

The take-up 24 is mounted on a frame 32 having rollers 33 which movably support the frame in an elongated supporting framework 34, which also supports the mono-rail 13. For normally urging the frame 32 to the left, a chain 35 is connected to the framework as indicated at 37, then is trained over a roller 38 mounted on the frame, then over a lower roller 39, and upper roller 40, on the framework, and then is connected at its lower end to a weight 41. While the size of the weight 41 is exaggerated or rather small compared to its actual dimensions, it is to be understood that this weight normally will be sufficient to move the frame 32 to the left to automatically take up slack in the chain. Preferably, a curved member 42 is disposed at the inner side of the curved rail sector 28 and this member carries vertically disposed rollers 43, to guide the chain 10 during its curvilinear movement. It will be understood that rollers of this character may be employed at any point in the system where curvilinear movement of the chain is required so that the chain may be deflected in its movement with a minimum of friction and interference. Moreover, this member 42 and rollers 43 carried by the movable frame 32 provide a positive means for moving the frame by the chain or vice versa for if such rollers or a suitable arrangement of this character were not provided, movement of the frame 32 by the chain or vice versa would have to be effected through the rollers 14 and mono-rail and since this is a flexible mounting, movement of the frame by the chain or vice versa would not be satisfactorily obtained. The drive unit for the conveyer chain, as shown by Figs. 2 and 4, may comprise a suitable, variable speed arrangement, but it is preferred to employ a drive unit known in the industry as the Reeves drive unit. While units of this character are well known in the industry, it is thought expedient to briefly describe its construction and manner of operation.

As shown by Fig. 2, the unit comprises a pair of shafts 50 and 51 and each of these shafts has a pair of oppositely disposed conical rollers 52 and 53 splined thereon. The rollers on one shaft are connected operatively to the rollers on the other shaft by means of a V belt 54. It should be evident now by moving the rollers on one shaft together and moving the rollers on the other shaft apart, the belt 54 will engage the more closely spaced rollers along a circumferential line of greater diameter, while it will engage the more widely spaced rollers on the other shaft along a circumferential line of smaller diameter. Hence by varying the spacing of the rollers on the two shafts, the drive between the two may be varied. The shaft 50 is driven by means of a motor 55, connected thereto by a chain and sprocket wheel connection 56. For simultaneously moving the conical rollers on one shaft together, and the conical rollers on the other shaft apart, levers 60 and 61 are provided which are pivoted respectively as indicated at 62 and 63 to stationary parts of the unit. At one end the levers 60 and 61, as shown in Fig. 2, are suitably connected to the rollers on the shaft 51 while the opposite ends of the levers are suitably connected to the rollers on the shaft 50, so that by pivoting the levers about the points 62 and 63, the rollers on shaft 51 may be spaced variable amounts and that the rollers on shaft 50 may correspondingly be spaced but oppositely. At one end the levers 60 and 61 are also suitably connected to a screw 66 having oppositely threaded end portions and provided with nuts (not shown) engaging the levers. By turning the shaft 66 the arrangement is such that the ends of the levers connected thereto may be moved apart or closer together and hence that the conical rollers on the two shafts may be varied in the manner previously described.

In this construction, a reversible motor 67 is employed for rotating the screw 66 and is connected thereto by suitable reduction gearing so that a small movement of the screw will be obtained upon rotation of the shaft. Operation of the motor 67 is controlled by well known electrical switch control mechanism indicated at 68 and this mechanism is in turn controlled by a lever 69. This particular type of electrical control is illustrated in the Reeves Pulley Company catalog of 1931. It should be understood that upon moving the lever 69 to the right, the motor 67 is energized to turn the screw 66 and hence to decrease speed of shaft 51 and that upon moving the lever 69 to the left the motor 67 is energized to increase the speed of shaft 51. The arrangement is such that any movement of lever 69 from any position it is in, energizes motor 67 according to movement of the lever or, in other words, the screw 66 will be turned according to the amount and direction of the movement of the lever.

The shaft 51 is connected by means of a chain 75 to a reduction gearing 76 having a shaft 77 which projects below the framework supporting the unit as shown by Fig. 4. This shaft is provided with a large sprocket wheel 78 adapted to cooperate with the conveyer chain 10, for pulling it in the direction indicated by the arrows.

Now as particularly shown by Fig. 4, a chain 80 is connected at a stationary point 81 to the framework 34, then is trained over a roller 82 fastened on the movable frame 32, then over a roller 83 mounted on the framework at the right side of the variable speed control arm 69, then is connected as indicated at 84 to such arm, then is trained over a lower roller 85 and upper roller 86 on the framework, and then extends downwardly and is connected at its end to a counter weight 87.

It will be understood from this description that when the framework 32 moves to the left the lever 69 will move to the right and conversely, when the frame 32 moves to the right the counter weight 87 will move the lever 69 to the left. Upon any movement of the frame 32 to the left, the speed of shaft 77 will be decreased, until the frame 32 stops moving, after which the shaft 77 will rotate at a constant rate of speed and upon any movement of the frame 32 to the right the speed of the shaft 77 will increase until the frame 32 stops moving when the shaft 77 will again rotate constantly. It should be understood that this increase or decrease of the speed of shaft 77 will occur upon any movement of the frame 32 to the right or left respectively, regardless of where the frame 32 is positioned before it begins to move.

Figure 5:
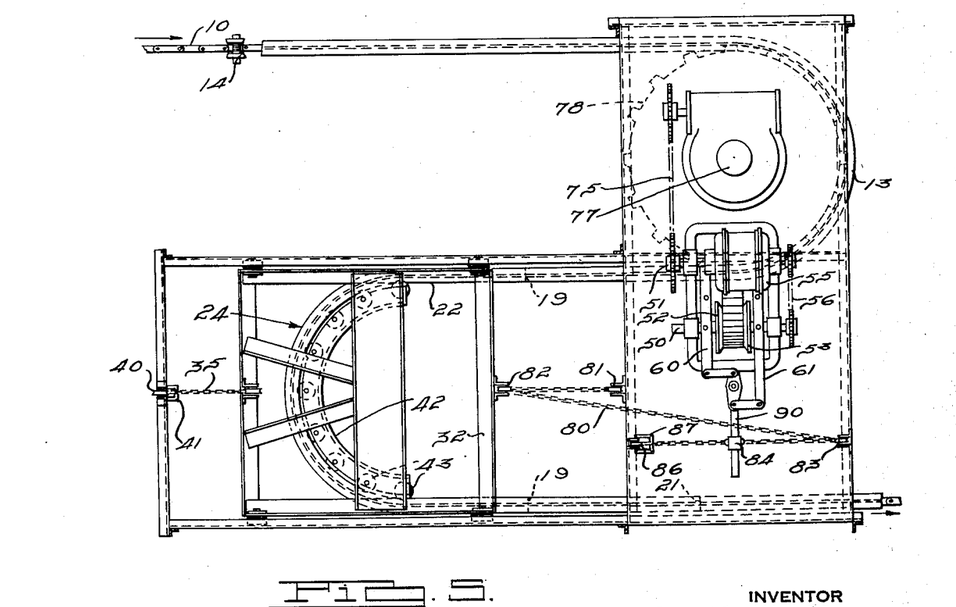
Fig. 5 is a plan view of the drive unit arrangement indicated at B in the diagrammatic system shown by Fig. 1, which differs from that shown by Fig. 2, in that the speed-varying means is controlled mechanically.

The unit B shown by Fig. 5 is substantially identical to the unit shown by Figs. 2 and 4 with the exception that the movement of levers 60 and 61 is controlled by a lever 90, connected thereto by means of a bell crank arrangement.

Figure 6:
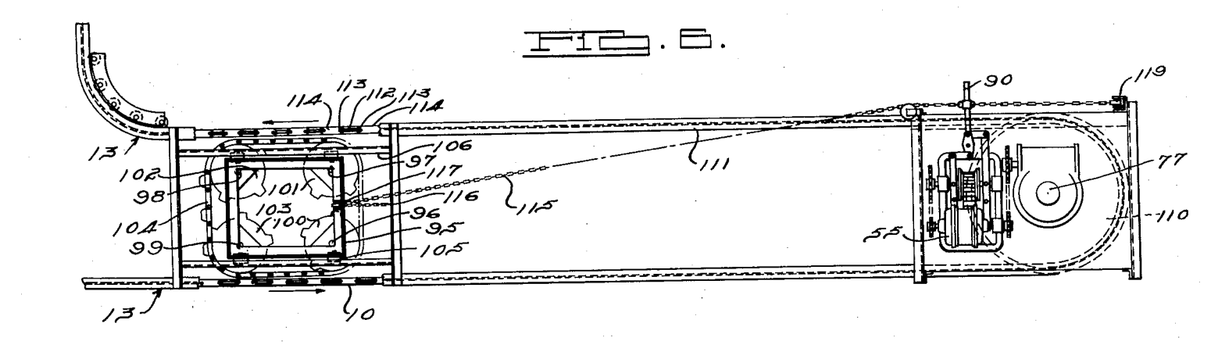
Fig. 6 is a plan view of the drive unit arrangement indicated at C in Fig. 1.
Figure 7:
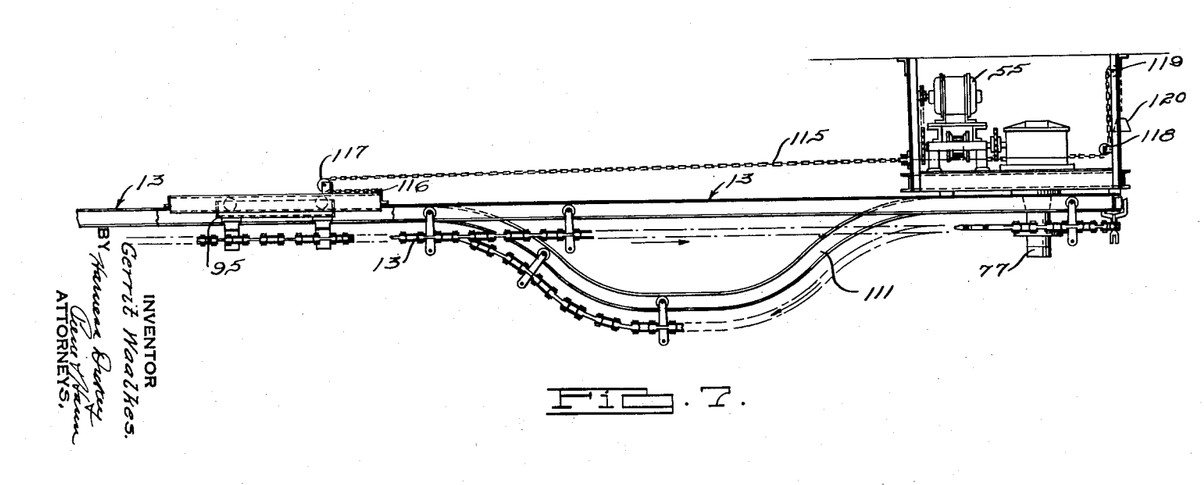
Fig. 7 is a side elevational view of the unit shown by Fig. 6.

In the unit C shown by Figs. 6 and 7, it will be observed that a movable frame 95 of rectangular character is provided, which has vertically disposed shafts 96, 97, 98 and 99 mounted in the corner portions thereof. These shafts respectively support rotary sprocket wheels 100, 101, 102 and 103, which are connected by an endless chain 104 so that at all times they rotate together. The chain and sprocket projections on the wheels are of such character that the projections extend beyond the plane of the chain and are adapted to cooperate with the conveyer chain 10 as particularly shown in Fig. 6, and it will be noted that the conveyer chain and mono-rail are so arranged at this point, that at one side the chain cooperates with the sprocket wheels 100 and 103, while at the other side it cooperates with the sprocket wheels 101 and 102. The frame 95 is supported by rollers 105 which may roll on stationary track members 106. From this description it should be evident that if the chain 10 at both sides moves at the same rate of speed, the frame 95 will remain stationary and the sprocket wheels will merely rotate, but if the chain 10 at one side moves faster than it does at the other side, the frame 95 will move to the right or left depending on which side of the chain is moving faster.

The chain 10 at the right of the construction shown by Fig. 6 is trained around a relatively large sprocket wheel 110 driven by the variable speed device like that shown in Fig. 5. Between the variable speed device and the frame 95, the upper run of the mono-rail, as shown in both Figs. 6 and 7, dips as indicated at 111. In this connection it may be stated that the chain 10 is so constructed that the links thereof may telescope, this being evident from the construction of chain as shown by Fig. 6, in which it will be noted that the connecting member 112 connected by pivot pins 113 to link members 114 has a slot along which the pins may travel and the chain may collapse or become effectively shorter in length. Of course, as long as any part of the chain is under tension that part will have full length character, but when there is slack in the chain it may collapse.

The frame 95 is connected to the lever 90 of the variable speed unit by means of a chain 115, which is connected at one end to a stationary member as indicated at 116, then trained over a roller 117 on the frame 95, then connected to the lever 90, then trained over a roller 118, then upwardly and over a roller 119 and then downwardly where its other end is connected to a weight 120.

Normally, the dip in the mono-rail 111 will have a collapsed portion of the chain therein so that at the advance side of the drive unit there will be slack in such chain. If the preceding drive unit should operate at a different rate of speed, it is apparent that the amount of collapsed chain in the dip portion of the mono-rail will vary and also the frame 95 will move and in so moving the arm 90 will move to vary the speed of the drive unit C accordingly.

In the drive unit arrangement shown by Figs. 8 and 9, which is indicated at D in the diagrammatic illustration of Fig. 1, a slightly different type of variable speed unit is provided in that it has an additional sprocket wheel drive 125, driven from the shaft 77, and the sprocket wheels on such shafts are connected by an endless chain so that the shaft 77 drives both wheels. The arrangement of this chain on the sprocket wheels is similar to the arrangement of the chain 104 on sprocket wheels 100 to 103 inclusive, so that at one side the teeth on the chain project beyond the chain for cooperation with the main conveyer chain 10. This type of unit is known as the caterpillar drive unit. The opposed side of the sprocket wheels drives an endless chain 127 and this chain extends parallel to the conveyer chain 10. At the advance side of the drive unit the monorail has a dip 128 for permitting collapsing of the chain thereinto and hence to accommodate the slack at the advance side of the unit. In advance of this slack, the chain 10 cooperates with sprocket wheels 130 and 131 which, similarly to the caterpillar drive on the drive unit, are interconnected by a chain 132. The sprocket wheels 130 and 131 are mounted on shafts journaled in a frame 133 supported by rollers 134 for movement longitudinally in a framework 135. The teeth of the sprocket wheels cooperate both with the chain 10 and with the chain 127. As shown by Fig. 9 particularly, a chain 136 is connected at one end as indicated at 137 to the framework 135, then is trained about a roller 138 on the movable frame 133, then is connected to the variable speed control lever 90, then is trained over lower and upper rollers 139 and 140, and at its end is connected to a weight 141. If the drive unit in advance of the drive unit D should travel at a higher rate of speed while unit D is operating at a slower speed, it is apparent that the movable frame 133 will move to the left, and that the slack in the dip 128 of the mono-rail permits a more rapid movement of the chain in advance of drive unit D without affecting the speed of such unit. As the movable frame 133 moves to the left the speed of unit D will be increased as a result of moving lever 90 to the left so that the speed of the drive unit D may increase and synchronize with the speed of the unit in advance thereof. Conversely, when the speed of the unit in advance of D decreases a corresponding decrease of the speed of unit D will occur as a result of movement of lever 90 to the right which is caused by the counter-weight 140.

From the description so far given of the several different types of drive units illustrated, it should be understood that at the advance side of each drive unit the conveyer chain constantly has some slack therein and that this slack is accommodated by means which readily permits its variation. The provision of slack at the advance side of each drive unit manifestly will prevent the drive unit at the advance side of the slack from carrying more than the load on that part of the conveyer between it and the succeeding drive unit and hence each drive unit always will carry only that part of the conveyer load which it is supposed to carry. The provision of means for accommodating a variable amount of slack also will permit a change in speed of any one drive unit with respect to the succeeding drive unit without removing this slack so that even during such change in speed each drive unit will continue to carry the load between it and the succeeding drive unit.

The conveyer system illustrated by Fig. 1 diagrammatically, shows the different drive units A, B, C and D operating together, but it is quite evident that the system may have all drive units of the A type, or of the B type, or of the C type, or of the D type, or any combination of drive units shown. Also, it is evident that in the variable speed drive units employed, the control means for the speed varying mechanism may be operated electrically as considered with respect to drive unit A, or they may be mechanical as described with respect to the other drive units. It should be apparent also that the invention is applicable to different types of conveyer systems, as for example, a system in which an endless belt travels around rollers, it being evident that slack take-up devices and drive units might be used cooperatively in a conveyer of this character for controlling movement of the belt.

It being evident that the units in the system shown by Fig. 1 may be alike or of different types, a description of the operation of the system without referring to the particular type of unit employed in any one place, will suffice for the different combinations of units that may be employed. Preferably, in operating the system one of the drive units will constitute what may be termed the master control unit and, assuming that the unit A is to be used for this purpose, the slack take-up device in advance thereof, or frame 32 will not be connected to the variable speed control lever 69 as this lever will be employed for manual control purposes. Assume that the conveyer system is operating at a normal rate of speed in which, of course, slack will be provided at the advance side of each unit to prevent one unit from carrying more than its share of the load. Now if it is desired to increase the speed of operation of the system, lever 69 in unit A will be moved to the left which will increase the speed of operation of the unit A. As unit A increases in speed, it is quite apparent that the chain 10 between this unit and the succeeding unit D will speed up and consequently that the slack chain in advance of the drive unit D, in this instance the slack in the dip in the monorail, will be decreased in amount. Now referring to Figs. 8 and 9, it is apparent that as the speed of chain 10 increases at the advance side of the slack, and at the same time reduces the amount of slack, this increase in speed of the chain will occur prior to any increase in speed of auxiliary chain 127. Hence, the frame 133 will move to the left and this will move the lever 90 to the left which will increase the speed of unit D. The speed of this unit will increase until the speed of chain 10 passing therethrough equals the speed of chain at the advance side of the slack from which it follows that finally the chain 10 will be moving through units A and D at the same rate of speed although, of course, the amount of slack will have been reduced. Now as the speed of unit D increases, the same operation will occur between units D and C until the speed of unit C equals the speed of unit D, it being understood that the slack in advance of C also will be reduced. In the same manner, the speed of the succeeding two units B will be increased until all of the units are operating synchronously. Probably the speeds of the units D, C and B will not be fully increased in successive order, although this would be possible perhaps, but the speed of unit A as it increases slightly, will increase the speed of D, the speed of D as it increases slightly, will increase the speed of unit B slightly, and so on, and consequently the speeds of the several units will be progressively increased together although there probably will be some lag in speed in each succeeding unit until it finally catches up with the unit in advance thereof. As the slack is removed in advance of each unit, it is quite apparent that the advance slack of unit A will be additive with respect to the slack in advance of the other units, or in other words, the amount of slack increase at the advance of unit A will total the amount of slack decrease at the advance of the other units. This same operation would occur if any one of the other units were used as the master control instead of the unit A.

If the speed of unit A is decreased, it is apparent that a reversed operation will occur, first resulting in an increase in slack in advance of unit D until unit D is traveling at the same rate of speed as unit A, when this slack will become constant. Each unit as it decreases in speed will have the slack in advance of it increase and the slack in advance of the master control unit A will be decreased an amount corresponding to the sum of the increases in advance of the other units.

It may be desirable to have the master control unit operating at a fixed rate of speed and the other units of the variable speed control types. Under this set of circumstances, if the speed of any of the variable units should decrease for any reason whatever, it is apparent that the speed of the succeeding units will vary accordingly, until the interfering factor is obviated when the speed of the units will again regain their initial rates. The master control having a set rate of speed will insure that the succeeding units normally will operate at the same rate of speed unless, of course, interfering factors such as mentioned vary the speed of any of the units, but as soon as these factors are obviated, all of the units will again operate at the set speed of the master unit. That unit succeeding the master unit will be governed by the latter, and in turn the succeeding unit will govern the unit succeeding it, since the speed of each succeeding unit will be controlled by the amount of slack in advance thereof. If the master control maintains its speed, and the succeeding unit or any succeeding unit be excessively loaded temporarily, for example, it will tend to slow down, and this movement will decrease the amount of slack in front of it and this action will automatically tend to increase the speed of the unit. As the speed of the unit increases, the slack in front of it again will increase until normal, when the speed of such succeeding unit again will synchronize with the speed of the master unit. If the master unit should change its speed for any reason whatever, the speeds of the succeeding units will automatically vary therewith until finally the master unit again operates at the speed for which it is set when the rest of the units would have stepped in line therewith and be operating synchronously thereto.

If the length of chain or conveyer varies between the master unit and succeeding unit or between the latter and any succeeding unit thereto, it is quite apparent that the amount of slack in the conveyer between the two units involved will vary, and hence the speed of such succeeding unit will vary to compensate for such change in length of conveyer either to increase the speed of the unit or decrease its speed, depending upon whether or not the length of conveyer has decreased or increased.

Whether or not a fixed speed or variable speed master control unit is employed, it is apparent that all of the succeeding units, other conditions being the same, will operate at synchronous speed to the master unit. While variations may occur in speeds of any one or more of the units under either arrangement, normally the units will operate synchronously to the master unit and at all times slack in the conveyer at the advance side of each unit will be maintained so that each unit will carry no more of the conveyer load than between it and the succeeding unit.

Figure 10:
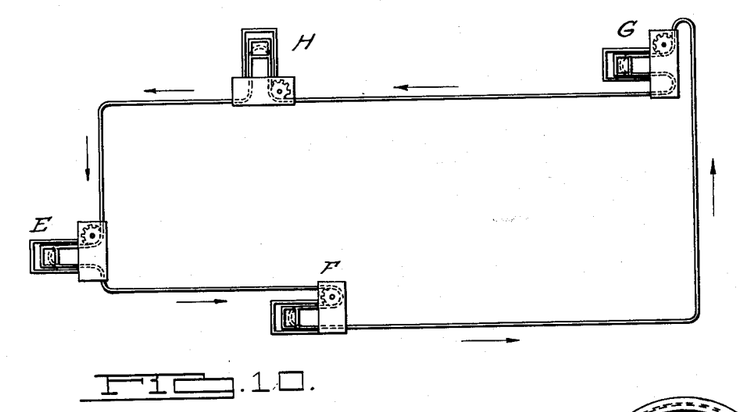
Fig. 10 is a diagrammatic illustration of a different type of system in which a substantially constant amount of slack at the advance side of each unit is maintained regardless of variations in speed and operating conditions of the system.

Referring now to Fig. 10, a system is illustrated, which for example, includes four drive units E, F, G, H, although any number more than one may be employed. Unit E for example, may be considered the master unit, in which event it will be understood that its speed may be fixed, or that a variable control arrangement may be used such as shown by either of Figs. 2 or 5. If the speed of the unit is variable, a control arm 69 or 90, will be used, depending on the control mechanism employed so that by manually moving the arm, the speed of the unit may be varied.

Units F, G and H may each be as shown by Fig. 10, in which the arrangement is similar to that shown by Fig. 2, and accordingly in Fig. 10, numerals corresponding to those in Fig. 2 will be used. The principal distinction between Figs. 2 and 10 is in the manner of controlling the operation of motor 67, which it will be recalled, governs the speed of the unit. Now as shown by Fig. 10, a control arm 150 is provided which may be pivoted as indicated at 151, at a stationary point. At opposite sides of this pivot, electrical contacts, or pairs of contacts, 152 and 153 are provided, which selectively may be engaged by the control arm when it moves in opposite directions. When the end of the arm engages contact or pair of contacts 152, motor 67 is energized to rotate in such direction that the speed of the unit is increased, whereas when the arm contacts with contact or pair of contacts 153, the motor 67 operates in the reverse direction to decrease the speed of the unit. Any suitable electrical circuits may be employed to obtain this result, and it hardly seems necessary to describe a circuit in detail, as it is obvious that arm 150 engaging contact or contacts 152 may complete a circuit for operating the motor in one and the proper direction, and engagement of the arm with contact or contacts 153 will complete a circuit for operating the motor in the opposite direction. This arm, it will be understood, is connected to the chain 80 which in turn is connected to the slack take-up frame 32.

Assuming that the speed of unit E is increased, it is apparent that frame 32 of unit H will move to the right, as the slack begins to decrease slightly, and this will cause arm 150 to move to the left and after a predetermined decrease in slack, the arm will engage contact or contacts 152, thereby energizing motor 67 which then causes unit H to increase in speed. Unit H will continue to increase in speed until it is operating faster than unit E, whereupon the slack in advance of unit H will increase and move arm away from contacts 152. The unit H then will operate constantly although faster than unit E, until the slack has increased to cause arm 150 to engage contact or contacts 153, when motor 67 is energized and then the speed will begin to decrease. The speed will decrease until the arm moves away from contacts 153, and then will operate at the decreased speed, slower than the speed of unit E, until the arm again engages contacts 152. From this it will be apparent that the arm 150 will "hunt" between contacts 152 and 153 and that speed of unit H first will be faster and then slower than the speed of unit E. The variation in speed of unit H, and hence the variation in slack in advance thereof, of course, may be made very small by having the arm 150 and the contacts 152 and 153 so arranged that a small variation in slack will cause the arm to move from one contact to the other.

It is, of course, apparent that decreasing the speed of unit E first will cause unit H to decrease in speed until it is slower than unit E, and then it will increase and decrease as previously described. Moreover it should be clear that as the speed of unit H varies, units G and I vary, each being controlled by the variation in slack in advance thereof.

In general then the speed of unit H will be constantly "hunting" to synchronize with the speed of unit E, its speed first being slightly greater and then slightly less, although the variation from the speed of unit E may be so slight that the conveyer chain pulled by unit H apparently moves at a constant rate of speed equal to that movement of the chain pulled by unit E. In turn the speed of unit G will "hunt" the speed of unit H, and the speed of unit F will "hunt" the speed of unit G. It follows when the speed of unit E varies, the units H, G and F will "hunt" the new speed in the manner described until finally all are operating at substantially the new speed. Moreover, while the slack in advance of each unit, may vary slightly owing to this "hunting" of the unit, the amount of slack will be approximately constant within a small range of variation. Therefore the slack take up in advance of the master unit, need not be built to accommodate a wide variation in slack, as would be necessary if it had to compensate for accumulative large increases and decreases in slack at the advance side of the other units.

Figure 11:
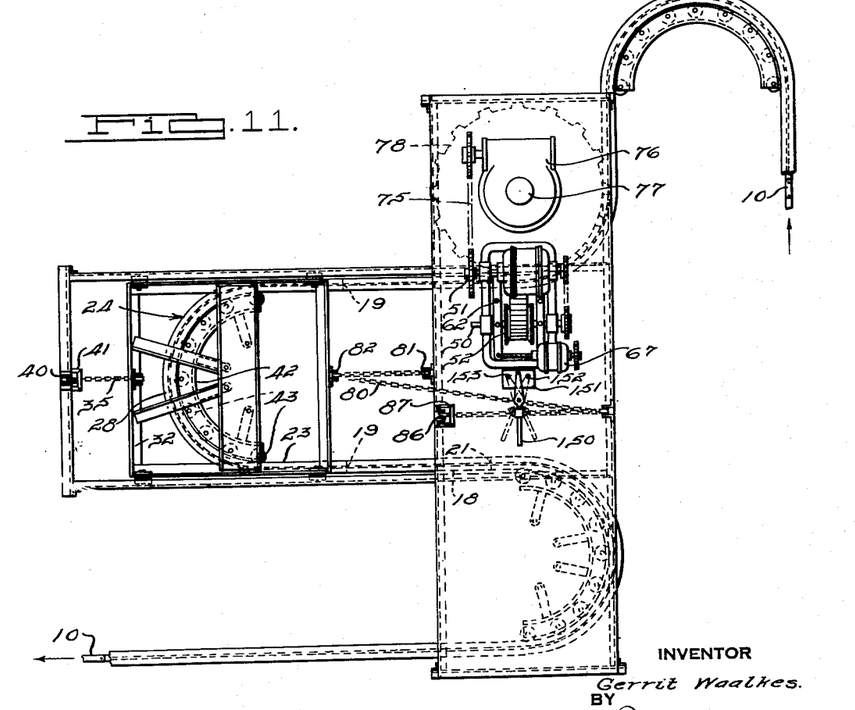
Fig. 11 is a view similar to Fig. 2, illustrating one of the units in Fig. 11.

It should be understood that the units E, F, G and H may have different types of slack take up devices in advance thereof, as it is apparent that any slack take up shown in Figs. 1 to 9 inclusive would properly function in conjunction with any unit having the control arm 150 shown by Fig. 11.

From the foregoing it should be apparent that a conveyer system has been advanced of the multiple drive unit type, which will so operate that each drive unit at all times will take care of its own load and is not subjected to loads that are supposed to be carried by one or more other units in the system. Moreover, it is apparent that the system includes a master control unit which may be either of the variable speed or fixed speed types, by means of which the succeeding units may at all times be controlled. Normally, of course, the succeeding units will operate substantially synchronously to the master control unit, but variations in speed in any of the units may occur. The master control unit may, of course, vary in speed also but will finally and normally operate at its set speed and the other units will normally be in line with it. A system of this character compensates for various normally interfering factors present in the operation of conveyer systems and insures normal operation of the system at the speed desired, while at the same time insuring proper distribution of the loads. Particularly it will be apparent that the operation of each unit and of the system as a whole is controlled by the amount of slack in the conveyer in advance of each drive unit.

Although more than one form of the invention has been illustrated and described in detail, it will be apparent to those skilled in the art that various modifications may be made without departing from the scope of the appended claims.

I claim:
1. An endless conveyer system comprising a movable conveyer chain collapsible in its own plane to accommodate slack, means for carrying the chain, variable drive means along the chain for driving it, said chain being so arranged between drive means that a variable amount of slack is provided at the advance side of each drive means, and means for synchronizing the speeds of the drive means upon variation of the slack therebetween.

2. An endless conveyer system comprising an endless rail, an endless chain, rollers connected to the chain and movably engaging the rail and suspended therefrom, variable speed drive means along the conveyer for moving it, means forming a part of the rail construction for accommodating slack at one side of the drive means, and means controlled by said slack for controlling the speed of operation of said drive means.

3. An endless conveyer system comprising an endless rail, an endless chain, rollers connected to the chain and movably connected to the rail and suspended therefrom, variable speed drive means along the conveyer for moving it, and means comprising a section of the rail variable in effective length, for accommodating slack at one side of the drive means and for controlling operation of the latter.

4. An endless conveyer system comprising an endless rail, an endless chain, rollers connected to the chain and movably engaging the rail and suspended therefrom, variable drive units along the conveyer for moving it, movable means comprising a section of the rail variable in effective length, for accommodating slack in said chain at one side of the drive means, and means controlled by said movable means for controlling the speed of operation of the drive units.

5. An endless conveyer comprising a rail having parallel terminating portions, and an interconnecting portion bridging the terminating portions and having slidable complementary engagement therewith so as to provide a rail of variable length and in effect uninterrupted, an endless chain having rollers movably engaging and supported by the rail, variable speed driving units operatively connected to the chain for driving it, and means for varying the speed of the units, governed by the position of the interconnecting rail portion.

6. An endless conveyer system comprising an endless rail, an endless chain collapsible in its own plane to accommodate slack, means comprising a dip in the rail construction for allowing the slack to automatically accumulate therein, variable drive means along the chain for driving it, and means for governing the speed of operation of the drive means including means governed by the amount of slack chain on the dipped portion of the rail.

7. An endless conveyer system comprising an endless chain, means for supporting the chain, variable speed drive units along the chain for driving it, a movable carriage, rotary means on the carriage engaging oppositely moving runs of the chain and effecting movement of the carriage upon variation in the linear and relative speed of movement of the two runs of the chain, and means for varying operation of the drive units including means operated by movement of the carriage.

8. An endless conveyer system comprising an endless chain, means for supporting the chain, variable speed drive units for driving the chain, a second endless chain driven by the drive means, a movable carriage, means on the carriage engaging both chains and effecting movement of the carriage upon variation in linear speeds of the two chains relatively, and means controlled by movement of the carriage for controlling the speed of the drive unit.

9. An endless conveyer system comprising a pair of endless chains, variable speed drive means for driving the chains, means engaging both chains and movable upon variation of the relative speeds of the chains, and means controlled by movement of the latter means for varying the speed of operation of the drive means.

10. An endless conveyer system comprising a supporting rail structure, a movable conveyer carried by the rail structure, variable speed drive means along the conveyer for driving it, movable means forming a part of the rail structure but not interrupting the continuity thereof for accommodating variable slack in the conveyer adjacent the drive means, and means for synchronizing the speeds of the drive means according to variations in slack and movement of said movable means.

11. In a conveyer system, an endless rail structure, an endless conveyer carried by the rail structure, a variable speed drive means for driving the conveyer, movable means forming a part of the rail structure but not interrupting the continuity thereof for accommodating variable slack in the conveyer adjacent the drive means, and means for varying the speed of the drive means depending upon variation in slack and movement of said movable means.

12. An endless conveyer system comprising a movable conveyer chain collapsible in its own plane to accommodate slack, means for carrying the chain, variable speed drive means for driving the chain, and means for varying the speed of the drive means depending upon the amount of collapsing of the chain.

13. An endless conveyer system comprising a mono-rail, a movable conveyer carried by the mono-rail, variable speed drive means along the conveyer for driving it, movable means forming a part of but not interrupting the continuity of the mono-rail at the advance side of each drive means for accommodating variable slack in the conveyer, and means for synchronizing the speeds of the drive means according to variations in slack and movement of said movable means.

GERRIT WAALKES.